US010116868B2

(12) United States Patent
Wyrwas et al.

(10) Patent No.: US 10,116,868 B2
(45) Date of Patent: Oct. 30, 2018

(54) DISPLAY-INTEGRATED USER-CLASSIFICATION, SECURITY AND FINGERPRINT SYSTEM

(71) Applicant: QUALCOMM Incorporated, San Diego, CA (US)

(72) Inventors: John Michael Wyrwas, Mountain View, CA (US); Safi Khan, San Diego, CA (US); Evgeni Petrovich Gousev, Saratoga, CA (US); Russell Wayne Gruhlke, Milpitas, CA (US); Ying Zhou, Milpitas, CA (US); Frank Frederick Weckerle, Salinas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 465 days.

(21) Appl. No.: 14/499,860

(22) Filed: Sep. 29, 2014

(65) Prior Publication Data
US 2015/0310251 A1    Oct. 29, 2015

Related U.S. Application Data

(60) Provisional application No. 61/985,305, filed on Apr. 28, 2014.

(51) Int. Cl.
*G06K 9/00* (2006.01)
*H04N 5/232* (2006.01)
(Continued)

(52) U.S. Cl.
CPC ......... *H04N 5/23293* (2013.01); *G06F 21/32* (2013.01); *G06K 9/00046* (2013.01);
(Continued)

(58) Field of Classification Search
CPC ............... H04N 5/23293; G06F 21/32; G06K 9/00046; G06K 9/00087; G06K 9/2018; G06K 9/228
(Continued)

(56) References Cited

U.S. PATENT DOCUMENTS 5,619,586 A * 4/1997 Sibbald .............. G06K 9/00046
356/71
6,956,608 B1   10/2005 Shapiro et al.
(Continued)

FOREIGN PATENT DOCUMENTS

DE      19535803 A1    3/1997
EP      0609812 A1     8/1994
(Continued)

OTHER PUBLICATIONS

International Search Report and Written Opinion—PCT/US2015/022775—ISA/EPO—dated Oct. 5, 2015.
(Continued)

*Primary Examiner* — Christopher S Kelley
*Assistant Examiner* — Matthew K Kwan
(74) *Attorney, Agent, or Firm* — Weaver Austin Villeneueve & Sampson LLP

(57) ABSTRACT

This disclosure provides systems, methods and apparatus related to biometric authentication of a user of an electronic device. An electronic display has a display cover glass with a front surface that includes a viewing area, and a fingerprint reading area within the viewing area. At least one photo-sensing element is configured to detect received scattered light, the received scattered light resulting from interaction of light with an object in at least partial optical contact with the front surface within the fingerprint reading area and to output, to a processor, fingerprint image data.

45 Claims, 8 Drawing Sheets

(51) Int. Cl.
*G06F 21/32* (2013.01)
*G06K 9/20* (2006.01)
*G06K 9/22* (2006.01)

(52) U.S. Cl.
CPC ....... *G06K 9/00087* (2013.01); *G06K 9/2018* (2013.01); *G06K 9/228* (2013.01)

(58) Field of Classification Search
USPC .......................................................... 348/77
See application file for complete search history.

(56) References Cited

U.S. PATENT DOCUMENTS

| | | | |
|---|---|---|---|
| 8,077,929 | B2 | 12/2011 | Heidt et al. |
| 8,605,960 | B2 | 12/2013 | Orsley |
| 9,582,117 | B2 | 2/2017 | Wyrwas et al. |
| 2002/0076089 | A1 | 6/2002 | Muramatsu et al. |
| 2002/0131624 | A1 | 9/2002 | Shapiro et al. |
| 2004/0234107 | A1 | 11/2004 | Machida et al. |
| 2005/0063573 | A1* | 3/2005 | Setlak ................ G06K 9/00013 382/124 |
| 2005/0069180 | A1 | 3/2005 | Setlak et al. |
| 2005/0162398 | A1 | 7/2005 | Eliasson et al. |
| 2006/0001654 | A1 | 1/2006 | Smits |
| 2007/0189588 | A1 | 8/2007 | Kim et al. |
| 2007/0197261 | A1 | 8/2007 | Humbel |
| 2009/0039241 | A1 | 2/2009 | Ueki |
| 2009/0058598 | A1 | 3/2009 | Sanchez et al. |
| 2009/0141285 | A1 | 6/2009 | Levola et al. |
| 2011/0085070 | A1* | 4/2011 | Kang ............... B29D 11/00432 348/340 |
| 2011/0102567 | A1 | 5/2011 | Erhart |
| 2011/0122091 | A1 | 5/2011 | King et al. |
| 2012/0208592 | A1* | 8/2012 | Davis ................... H04W 4/001 455/556.1 |
| 2012/0249477 | A1 | 10/2012 | Popovich et al. |
| 2013/0106798 | A1 | 5/2013 | Sundara-Rajan et al. |
| 2013/0181949 | A1 | 7/2013 | Setlak |
| 2013/0265137 | A1 | 10/2013 | Nelson et al. |
| 2013/0285977 | A1 | 10/2013 | Bahara et al. |
| 2013/0314312 | A1 | 11/2013 | Gruhlke et al. |
| 2014/0098058 | A1 | 4/2014 | Baharav |
| 2014/0168162 | A1 | 6/2014 | Liao et al. |
| 2014/0340351 | A1 | 11/2014 | Forlines |
| 2015/0309662 | A1 | 10/2015 | Wyrwas et al. |

FOREIGN PATENT DOCUMENTS

| | | |
|---|---|---|
| EP | 1286518 A2 | 2/2003 |
| EP | 1420525 A1 | 5/2004 |
| EP | 1835438 A1 | 9/2007 |
| EP | 1988489 A1 | 11/2008 |
| EP | 2131322 A1 | 12/2009 |
| EP | 2336859 | 6/2011 |
| GB | 2417858 A | 3/2006 |
| JP | 2013175142 | 9/2013 |
| WO | WO-9706506 | 2/1997 |
| WO | WO-2008055164 | 5/2008 |
| WO | WO-2013111447 | 8/2013 |
| WO | WO-2013165749 | 11/2013 |
| WO | WO-2015167683 | 11/2015 |
| WO | WO-2015167711 | 11/2015 |

OTHER PUBLICATIONS

Invitation to Pay Additional Fees and, Where Applicable, Protest Fee—PCT/US2015/022775—ISA/EPO—dated Jun. 24, 2015.
International Search Report and Written Opinion—PCT/US2015/021245—ISA/EPO—dated Jul. 10, 2015.
U.S. Office Action dated Mar. 30, 2016 issued in U.S. Appl. No. 14/502,726.
U.S. Final Office Action dated Sep. 1, 2016 issued in U.S. Appl. No. 14/502,726.
U.S. Notice of Allowance dated Dec. 19, 2016 issued in U.S. Appl. No. 14/502,726.
Second Written Opinion—PCT/US2015/022775—ISA/EPO—dated May 13, 2016.
International Preliminary Report on Patentability—PCT/US2015/022775—ISA/EPO—dated Oct. 7, 2016.
Bangladesh Office Action dated Sep. 1, 2016 issued in BD/P/2015/96.
Second Written Opinion—PCT/US2015/021245—ISA/EPO—dated Apr. 25, 2016.
International Preliminary Report on Patentability—PCT/US2015/021245—ISA/EPO—dated Jul. 21, 2016.

* cited by examiner

DISPLAY-INTEGRATED USER-CLASSIFICATION, SECURITY AND FINGERPRINT SYSTEM

CROSS-REFERENCE TO RELATED APPLICATIONS

This disclosure claims priority to U.S. Provisional Patent Application No. 61/985,305, filed Apr. 28, 2014, entitled "DISPLAY-INTEGRATED USER-CLASSIFICATION, SECURITY AND FINGERPRINT SYSTEM," and assigned to the assignee hereof. The disclosure of the prior application is considered part of and is incorporated by reference in its entirety in this patent application.

TECHNICAL FIELD

This disclosure relates to techniques for biometric authentication of a user of an electronic device, and, more specifically, an electronic display that provides a user input/output interface integrated with a fingerprint reader.

DESCRIPTION OF THE RELATED TECHNOLOGY

Fingerprint readers are becoming popular in consumer devices such as mobile phones, tablets and notebooks as a security biometrics measure to replace or enhance password-based security. Typically, a dedicated fingerprint reader is disposed proximate to and separate from a display screen of the mobile device. The display screen may display a message that prompts the user to touch the fingerprint reader when authentication of the user is required.

SUMMARY

The systems, methods and devices of the disclosure each have several innovative aspects, no single one of which is solely responsible for the desirable attributes disclosed herein.

One innovative aspect of the subject matter described in this disclosure can be implemented in an apparatus that includes an electronic display, having a display cover glass with a front surface that includes a viewing area, and a fingerprint reading area within the viewing area. The electronic display also includes at least one photosensing element configured to detect received scattered light, the received scattered light resulting from interaction of light with an object in at least partial optical contact with the front surface within the fingerprint reading area. The photosensing element is configured to output, to a processor, fingerprint image data.

According to some implementations, an apparatus includes an electronic display, having a display cover glass with a front surface that includes a viewing area, and a fingerprint reading area within the viewing area, at least one photosensing element configured to detect received scattered light, the received scattered light resulting from interaction of light with an object in at least partial optical contact with the front surface within the fingerprint reading area and to output, to a processor, fingerprint image data.

In some examples, the fingerprint reading area may be substantially coextensive with the viewing area.

In some examples, the photosensing element may be disposed in or behind a plane that includes the front surface of the display cover glass.

In some examples, the photosensing element may be one or both of outside of the viewing area and proximate to a periphery of the viewing area.

In some examples, the photosensing element may include a camera. The camera may include a lens having an optical axis, the camera being disposed with the optical axis approximately parallel to the front surface. In some examples, the camera may include a video graphics array micro camera.

In some examples, the electronic display may include a first planar light guide disposed proximate to and behind the front surface and configured to redirect the received scattered IR light toward the photosensing element. The photosensing element may be optically coupled to the first planar light guide. In some examples, the display cover glass may include the first planar light guide. In some examples, at least some of the scattered light may undergo two or more internal reflections within the planar light guide before being detected by the photosensing element.

In some examples, the processor may be configured to determine whether a user is an authorized user, based on the fingerprint image data.

In some examples, the processor may be configured to make a biometric authentication of a user based on the fingerprint image data. The processor may be configured to make the biometric authentication in real time while the user is interacting with the electronic display screen. In some examples, the biometric authentication may include one or more of determining a user's identity, authenticating that the user is an authorized user, or otherwise classifying the fingerprint. In some examples, the electronic display may be communicatively coupled with a remote lockable device and the processor may cause the remote lockable device to lock or unlock after the biometric authentication. The electronic display may be communicatively coupled with the remote lockable device by a wired or wireless communication link. In some examples, the electronic display may be configured as a wearable device. In some examples, the processor may be configured to cause the electronic display to present, based on the biometric authentication, user-tailored content. The processor may be configured to display the user-tailored content in response to one or more of specific application profiles for each of a number of individual users and to a usage history and preferences of such individual users. In some examples, the processor may be configured to perform one or more of continuous biometric authentication and biometric authentication of multiple users interacting concurrently with the display screen.

In some examples, the electronic display may provide an input/output interface to a user of an apparatus or electronic device communicatively coupled with the electronic display.

In some examples, the electronic display may include at least one light source directing light into or through the planar light guide. The at least one light source may include one or more of a backlight of a liquid-crystal or field sequential color display, a front-light of a reflective display, an emissive display, and an infrared light emitted underneath and through an art-work area of the cover-glass. In some examples, the at least one light source may be disposed outside of or proximate to a periphery of the viewing area.

In some examples, the electronic display may include a second planar light guide disposed behind the first planar light guide and configured to redirect light received from a light source in a direction having a substantial component orthogonal to the front surface.

In some examples, the photosensing element may be configured to detect infrared light radiated by a surface of a user appendage. The processor may be configured to make a liveness determination of the user appendage based on a measurement of the radiated infrared light.

According to some implementations, an apparatus includes an electronic display, having a display cover glass with a front surface that includes a viewing area, and an optical imaging area within the viewing area, and at least one photosensing element configured to detect received scattered light, the received scattered light resulting from interaction of light with an object in optical contact with the front surface within the optical imaging area and to output, to a processor, image data.

In some examples, the optical imaging area may be substantially co-extensive with the viewing area.

In some examples, the object may be a finger or other appendage of the user and the optical imaging area is configured as a fingerprint reader.

In some examples, the object is a finger or other appendage of the user or an object to be imaged. The object to be imaged may be a document or displayed image that includes one or more of a bar code identifier or a cryptographic watermark.

In some examples, the photosensing element may be a camera, the camera including a lens having an optical axis; and the camera may be disposed with the optical axis approximately parallel to the front surface.

In some examples, the processor may be configured to make an authentication of a user based on the image data. The electronic display may be communicatively coupled with a remote lockable device and the processor may cause the remote lockable device to lock or unlock after the authentication of the user. In some examples, the processor may be configured to display, based on the authentication, user-tailored content.

According to some implementations, an apparatus includes an electronic display, having a display cover glass with a front surface that includes a viewing area, and a fingerprint reading area within the viewing area, and means for detecting received scattered light, the received scattered light resulting from interaction of light with an object in at least partial optical contact with the fingerprint reading area of the front surface, and to output, to a processor, fingerprint image data.

According to some implementations, a method includes detecting, with a photosensing element, received scattered light, the received scattered light resulting from interaction of light with an object being in at least partial optical contact with a fingerprint reading area of a front surface of a display cover glass of an electronic display, the front surface having a viewing area, the fingerprint reading areas being within the viewing area, and outputting, from the photosensing element to a processor, fingerprint image data.

In some examples, the method may include determining, with a processor, whether a user is an authorized user, based on the fingerprint image data.

In some examples, the method may include making, with a processor, a biometric authentication of a user based on the fingerprint image data.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

DETAILED DESCRIPTION

Figure 1:
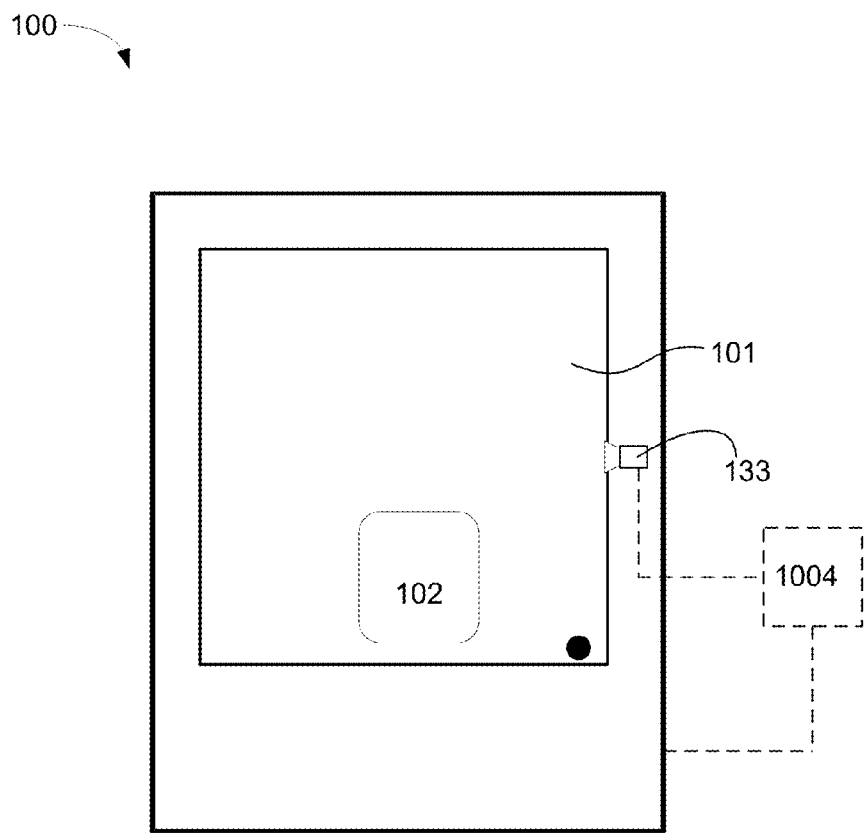
FIG. 1 illustrates a simplified block diagram of an electronic display, according to an implementation.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device or system that can be configured to display an image, whether in motion (e.g., video) or stationary (e.g., still image), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, GPS receivers/navigators, cameras, MP3 players, camcorders, game consoles, wrist watches, clocks, calculators, television monitors, flat panel displays, electronic reading devices (i.e., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS), microelectromechanical systems (MEMS) and non-MEMS applications), aesthetic structures (e.g., display of images on a piece of jewelry) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Described herein below are new techniques for imaging a fingerprint, or other object to be imaged, within a display screen area without necessarily using a dedicated fingerprint reader external to the display screen area. The techniques also enable real-time biometric identification of a user while the user is interacting with the display screen. In some implementations, the display screen is configured as part of a wearable device, such as a smart watch, for example, that is communicatively coupled with a remote lockable device such as a computer, an automobile, a door, a home appliance, medical devices or other devices. In such implementations, a user's fingerprint may be imaged by the display screen of the wearable device and processed by a microprocessor which may send a command to the remote device such as to cause the remote lockable device to lock or unlock after authentication of the user's identity.

Particular implementations of the subject matter described in this disclosure can be implemented to realize one or more of the following potential advantages. Relative to the prior art, the presently disclosed techniques enable a more compact electronic device that incorporates a fingerprint reading functionality within the perimeter of the electronic display rather than providing a fingerprint reader outside a perimeter of the electronic display. Moreover, where the electronic display provides a touch-screen user interface, the presently disclosed techniques permit automatic and continuous validation of the identity of one or more users, while the one or more users interact with the display.

One innovative aspect of the subject matter described in this disclosure can be implemented in an electronic display that includes one or more photosensing elements such as for example image sensor array cameras, each mounted within the plane or behind the plane of a display cover glass. The camera, which may be a video graphics array micro camera, may output image data from which an image of a human fingerprint may be obtained. In some implementations, the display screen is configured as part of a wearable device, such as a smart watch, for example, that is communicatively coupled with a remote lockable device such as a computer, an automobile, home appliance, medical devices or other device. In such implementations, a user's fingerprint may be imaged by the display screen of the wearable device and processed by a microprocessor which may send a command to the remote device such as to cause the remote lockable device to lock or unlock after authentication of the user's identity.

In some implementations, an apparatus or electronic device may cooperate with the electronic display to provide an input/output (I/O) interface to a user of the apparatus. The electronic display has a front surface that includes a viewing area. The apparatus may include the electronic display or be electrically or wirelessly coupled to the electronic display. The apparatus may include a processor, a planar light guide, a light source, and one or more cameras. The planar light guide may be disposed proximate to and behind the front surface. In some implementations, the planar light guide may include a cover glass or lens disposed proximate to and in parallel with the display layer of a mobile device computer monitor, television or the like, such that the planar light guide is disposed between the display layer and a user. A better understanding of the term "planar light guide" as the term is used herein and in the claims, may be obtained by referring to application Ser. No. 13/480,377, "FULL RANGE GESTURE SYSTEM" and application Ser. No. 61/947,971, "LARGE AREA INTERACTIVE DISPLAY SCREEN" each of which applications is assigned to the assignee of the present invention, and is hereby incorporated by reference into the present application in its entirety for all purposes.

The one or more cameras may be disposed proximate to a periphery of the viewing area. When an object such as a user's finger, or another object to be imaged contacts the front surface of the electronic display, light scattered from the object may undergo total internal reflection (TIR) within the planar light guide. At least some of the light, having undergone TIR, may reach the one or more cameras. The cameras may detect such TIR'd light and output to the processor, image data relative to the detected TIR'd light. The processor may recognize, from the image data, a user's fingerprint.

FIG. 1 illustrates a simplified block diagram of an electronic display, according to an implementation. An electronic display 100 includes a display cover glass 165 (FIG. 2) with a front surface 167 (FIG. 2) that includes a viewing area 101. The front surface also includes an optical imaging area 102. The optical imaging area 102 may also be referred to as the "fingerprint reading area". As illustrated in FIG. 1, the optical imaging area 102 may be a discrete region within the viewing area 101. In some implementations, the optical imaging area 102 may be substantially coextensive with the viewing area 101. The electronic display 100 includes at least one photosensing element 133 that is configured to detect light. As will be explained in more detail hereinbelow the photosensitive element 133 may receive scattered light that results from interaction of light with an object when the object is at least partially in optical contact with the front surface 167 within the optical imaging area 102.

The photosensitive element 133 may output, to a processor 1004 object image data. In some implementations, for example, the photosensitive element 133 may output fingerprint image data to the processor 1004. The processor 1004 may be communicatively coupled with the photosensitive element 133 and with other elements of the electronic display 100. In some implementations, the processor 1004 may be an integral part of the electronic display 100. In other implementations, as suggested by FIG. 1, the processor 1004 may be configured separately from the electronic display 100. In some implementations, the processor may be remotely located in, for example, a remote server.

In some implementations, the processor 1004 may be configured to determine an identity of a user. For example, the processor 1004 may be configured to compare fingerprint image data received from the photosensitive element 133 with fingerprint image data of known and/or authorized users. As a result, the processor 1004 may be configured to make a determination as to whether a user is an authorized user, based on the fingerprint image data received from the photosensitive element 133. In some implementations, the processor 1004 may be configured to make a biometric authentication of a user based on the fingerprint image data. For example, fingerprint image data that may be obtained when a user engages the optical imaging area 102 with a finger or other appendage may be compared against a database of known fingerprint images in order to authenticate identity of the user. In some implementations, the processor may be configured to determine whether a user is an authorized user or to make the biometric authentication in real time while the user is interacting with the electronic display screen. As a result, a more secure user interface may be obtained for applications such as electronic finance transactions online gaming, medical record requests, and the like.

In some implementations, the processor 1004 may be configured to cause electronic display the present user tailored content, based on the biometric authentication. For example, having made the biometric authentication, the processor 1004 may be configured to cause or enable the electronic display to present user-confidential information, or to present content based on a known user preference.

Figure 2:
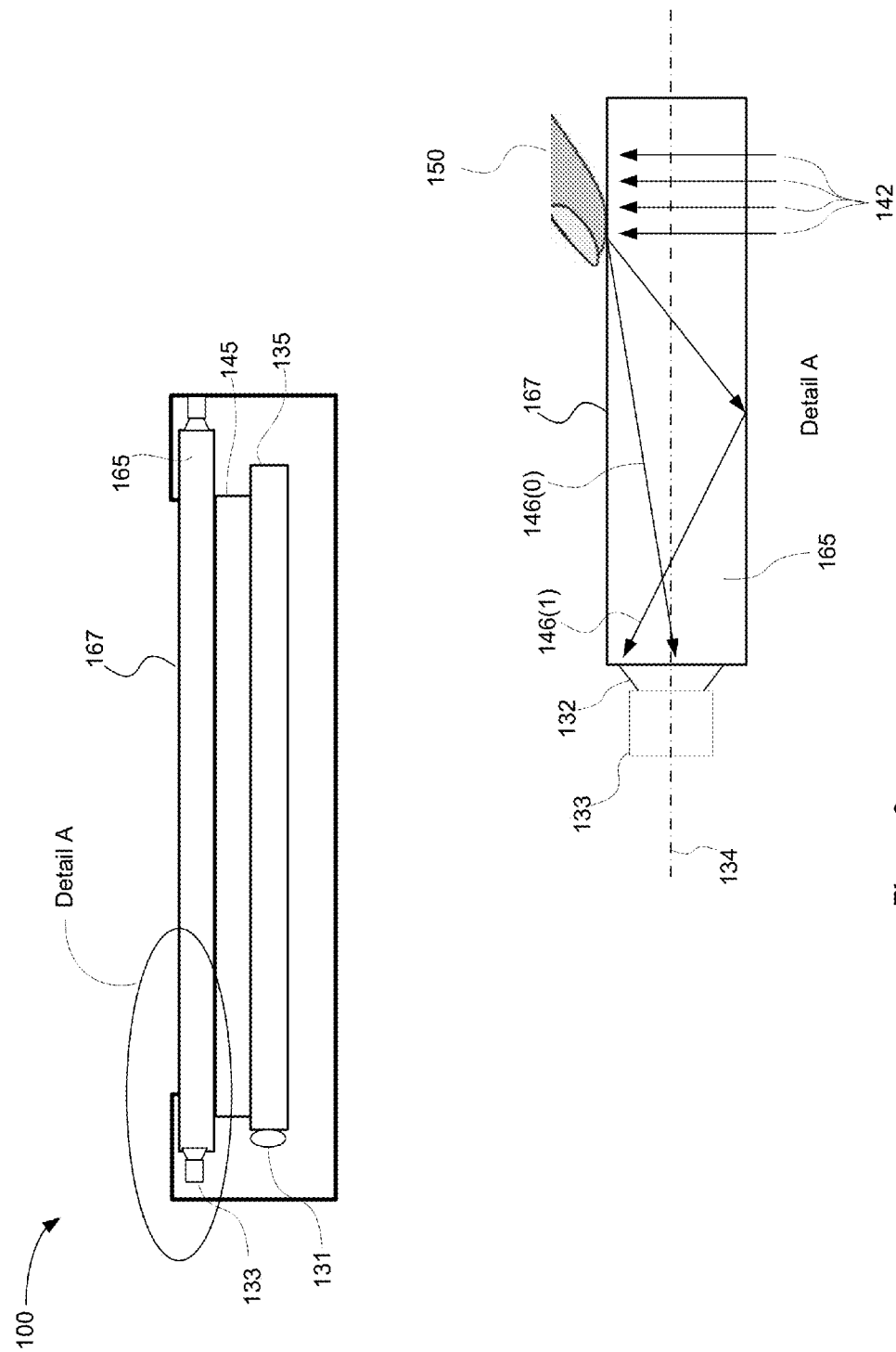
FIG. 2 illustrates a cross-sectional elevation view of the electronic display according to an implementation.

FIG. 2 illustrates a cross-sectional elevation view of the electronic display 100, according to an implementation. Electronic display 100 includes a first planar light guide 165 (which may be referred to herein also as a "cover lens" or a "cover glass"). The first planar light guide 165 may be disposed proximate to and behind a front surface 167 of the electronic display 100. In some implementations, a second planar light guide 135 (which may be referred to herein also as a "backlight") may be disposed behind the first planar light guide 165. A display layer 145 may be disposed between the first planar light guide 165 and the second planar light guide 135.

In the illustrated implementation, the electronic display 100 includes a light source 131 and a photosensing element 133 (which may be referred to herein also as a "camera") 133. The light source 131 may be, for example, a light emitting diode (LED). In some implementations, the light source 131 may include a plurality of LEDs disposed around a perimeter of the second planar light guide 135. The light source 131 may output infrared, red, blue, green, or another color or combination of colors, or white light. In the illustrated implementation, the light source 131 is disposed proximate to an edge of the second planar light guide 135. However, in other implementations, the light source 131 may include the backlight of a liquid-crystal or field sequential color display, the front-light of a reflective display (e.g. an interferometric modulator (IMOD) display), light from an emissive display (e.g. organic light emitting diode display), or an infrared light emitted underneath and through an art-work area of the cover-glass that is opaque to visible light.

The camera 133, in some implementations, is a video graphics array (VGA) micro camera. The camera 133 may be a black-and-white camera and may include light filters. The camera 133 may include a lens approximately 500 μm diameter and be included in a sensor package of less than 4 mm diameter. As a result, the camera 133 may be located in a coplanar arrangement with the first planar light guide 165 without adding appreciably to a stack height of the electronic display 100.

In some implementations, one or both of the first planar light guide 165 and the second planar light guide 135 may include a light turning arrangement (not illustrated). For example, the second planar light guide 105 may include a light turning arrangement having one or more of a microstructure or a grating that reflects light received from the light source 131 in a direction having a substantial component orthogonal to the front surface 167. Other light turning devices are within the contemplation of the present disclosure, including, for example, holographic film and surface relief grating that turn light by diffraction or surface roughness that turns light by scattering.

Referring now to Detail A of FIG. 2, light 142 may pass through the first planar light guide 165 and interact with an object 150. The object 150 is at least partially in optical contact with the top surface 167 of first planar light guide 165. The object 150 may be a finger or other appendage of the user or may be another object to be imaged, such as a document or electronically displayed image that includes a bar code identifier or a cryptographic watermark detectable by a visible or IR light camera. Scattered light 146 results from interaction of the light 142 with the object 150. Some of the scattered light 146, as illustrated by ray trace 146(0) may travel to the camera 133 and be detected by the camera 133 without being internally reflected by the first planar light guide 165. At least some of the scattered light 146 may undergo TIR. For example, as illustrated by ray trace 146(1) some of the scattered light 146 may undergo a single internal reflection before being detected by the camera 133. It will be appreciated that some of the scattered light may undergo two, three or more internal reflections before being detected by the camera 133. The camera 133 may output image data of the detected light to the processor 1004 (FIG. 1). Referring still to Detail A of FIG. 2, it is noted that the camera 133 may include a lens 132 having an optical axis 134. In some implementations the camera 133 may be disposed such that the optical axis 134 is approximately parallel to the front surface 167.

Where the object 150 is a human digit, such as a finger or thumb of a user, image data of the detected light may include a fingerprint. More particularly, in some implementations, it is contemplated that light from the light source 131 will interact with the surface of a digit in optical contact with the front surface 167. When finger skin ridges come in contact with the front surface 167, they scatter light into the first planar light guide 165. The scattered light 146(i) is guided to and then detected by the camera 133. Valleys between the finger skin ridges will not be in optical contact with the first planar light guide 165, and at least most light scattered by such valleys will not undergo TIR and as a result will not reach the camera 133. As a result, the ridges may correspond to bright areas in a camera image and the valleys to dark areas.

Figure 3:
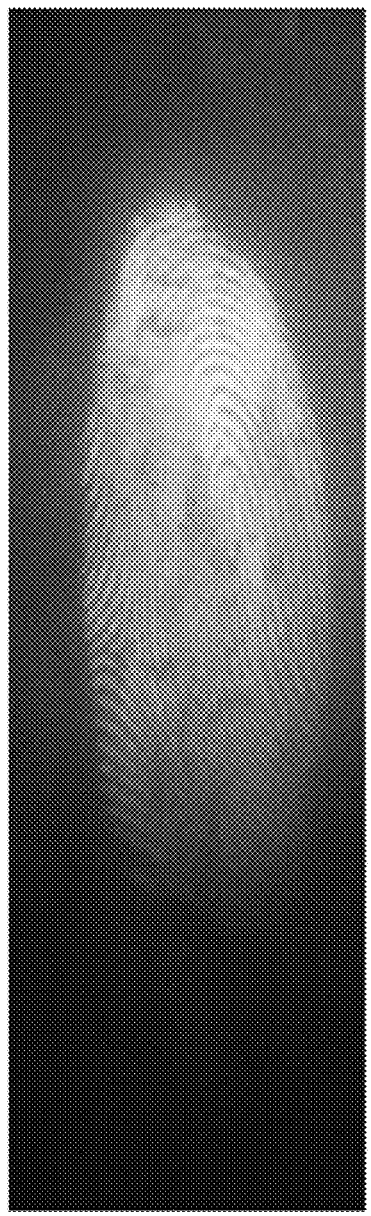
FIG. 3 illustrates an example of a camera image, obtained using the presently disclosed techniques.

FIG. 3 illustrates an example of a camera image, obtained using the presently disclosed techniques. In FIG. 3, more particularly, an image of a simulated fingerprint is illustrated as obtained by the camera 133. Thus the processor 1004 may receive, from the camera 133, an image of a user's fingerprint, as well as a location of the user's touch. A computer algorithm executed by the processor may interpret the fingerprint image to determine a user's identity, authenticate that the user is an authorized user, or otherwise classify the fingerprint.

In some implementations, the user interacts with software and computer applications through a touch-screen interface of the electronic display 100. As a result, the user may be touching the display on a regular basis. The fingerprint detection techniques disclosed herein may be run continuously or at intervals during periods when the user is interacting with the electronic display 100 by touch. Resulting user identity information may be used in a variety of ways. For example, it is contemplated that user-tailored content may be presented in response to, for example, specific application profiles associated with each of a number of individual users and/or to the usage history and preferences of such individual users. In some implementations, the processor may be configured to cause or enable the electronic display to present user-confidential information, or to present content based on a known user preference or based on recent user activity. Moreover, continuous security authentication may be provided and/or multiple users interacting at the same time with the electronic display 100 may be tracked.

As indicated above, the viewing area 101 of the electronic display 100 may include an optical imaging area (fingerprint reading area) 102. In some implementations, the fingerprint reading area 102 may be substantially coextensive with the viewing area. In some implementations, the fingerprint reading area 102 may include only a specific portion of the viewing area that is intended to be responsive to fingerprint detection, the specific portion being smaller in size than the viewing area. For example, there may be a virtual button on the electronic display 100 presented within the viewing area 101 by an application to inform the user that a fingerprint detection will take place in that area. Alternatively or in addition, there may be a particular area near the edge or the corner of the screen that performs authentication when touched (e.g. a "Start" button or menu button of a graphical user interface presented on the electronic display 100 may, when touched by a user, initiate a check of the user identity).

Figure 4:
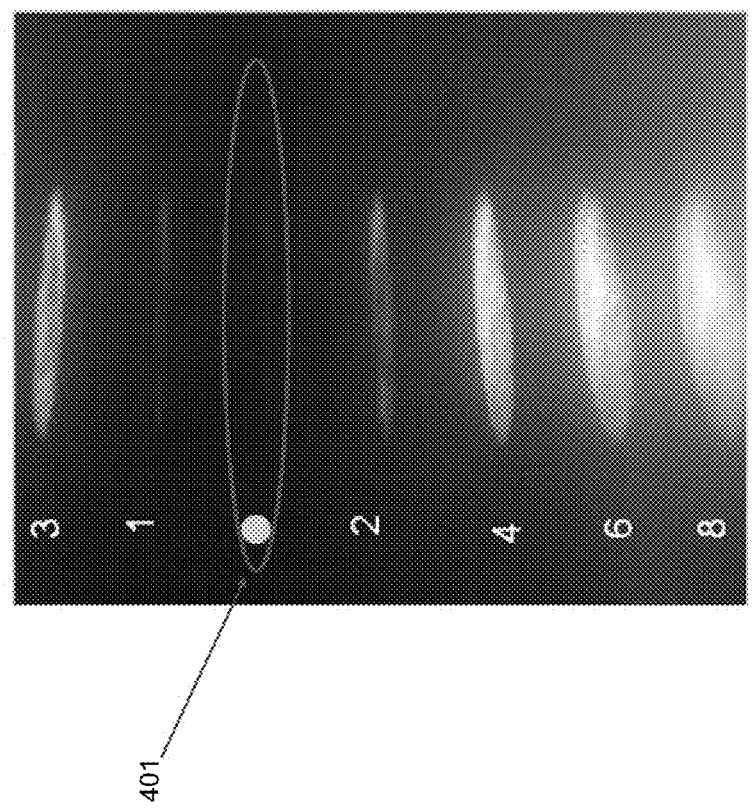
FIG. 4 illustrates an example of another camera image, obtained using the presently disclosed techniques.

Referring again to Detail A of FIG. 2, although two ray traces, 146(0) and 146(1), are illustrated, it will be appreciated that multiple discrete reflections of an image of the object 150 may be detected by the camera 133. Generation of these multiple discrete reflections may be referred to herein as the kaleidoscope effect. FIG. 4 illustrates an example of another camera image, obtained using the presently disclosed techniques. More particularly, FIG. 4 illustrates an example image from the camera 133 of a single finger touch at the middle of the field of view of the camera 133. In the illustrated example, the direct image of the touch is at location 401. Image data above and below the location 401 result from light rays that have undergone one or more internal reflections between the object 150 and the camera 133.

Figure 5:
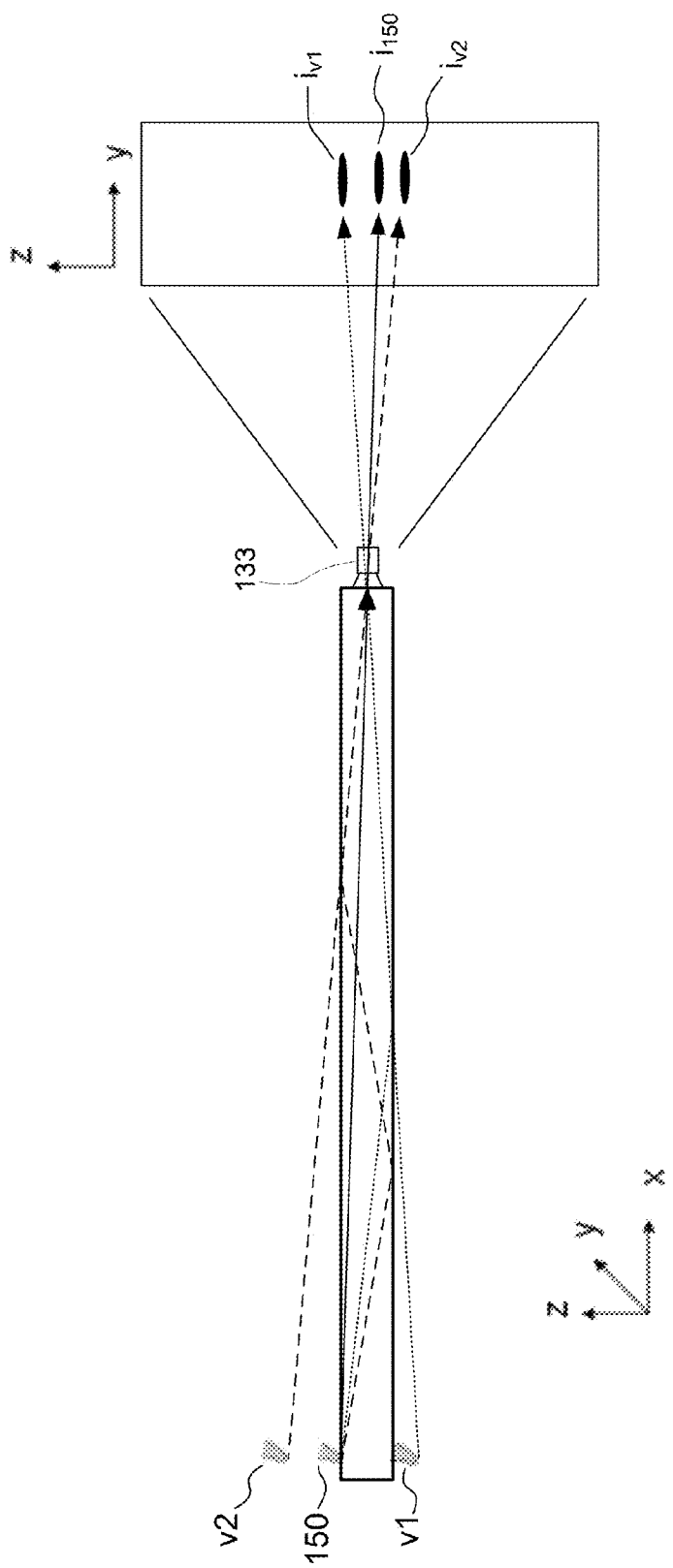
FIG. 5 illustrates an example of the kaleidoscope effect.

FIG. 5 illustrates an example of the kaleidoscope effect. More particularly, FIG. 5 illustrates how each of multiple images registered by camera 133 corresponds to light that is scattered from an object 150 at a different angle that may be related to a respective virtual object location. For example image $i_{150}$ corresponds to a direct image of object 150. Image $I_{v1}$ results from light rays that have undergone a single internal reflection and corresponds to a virtual object location v1. Image $I_{v2}$ results from light rays that have undergone two internal reflections and corresponds to a virtual object location v2. In some implementations, a computer algorithm may use the angular information of the finger ridge scattering for an additional dimension of information (not available in conventional fingerprint readers) for recognizing or classifying different fingerprints. For example the additional information may be used to reconstruct an approximation of the 3D profile of the finger ridges.

In some implementations, the camera 133 may take images both in the infrared and visible spectrum and/or multiple images may be captured in time sequence. The spectral and/or temporal information may be used to perform "liveness testing" of the object that is to determine whether it is an actual digit of a living human being. For example, an algorithm may be applied to the spectral and/or temporal information and signal intensity to determine pulse-oximetry, heart rate, skin color, glucose composition, etc.

In some implementations, the camera 133 may have a pixel or pixels sensitive to the thermal infrared wavelengths. Alternatively or in addition, one or more thermal infrared sensors may be placed at the periphery of the electronic display 100. In such implementations, light radiated by the skin in the thermal infrared, rather than reflected from illumination, may be used for liveness testing.

In some implementations, a filtering and contrast enhancement/image sharpening algorithm may be applied to the camera images to improve fingerprint recognition or classification. Alternatively or in addition, a de-convolving algorithm may be applied to the fingerprint pattern to isolate overlapping parts of each of the multiple reflections.

In some implementations, a super-resolution algorithm may be used with spectral, temporal, and/or phase information from the cameras to improve the resolution, and improve fingerprint recognition or classification.

In some implementations, a film or surface treatment may be applied to the top surface of the light guide to enhance the fingerprint contrast or optical coupling. Alternatively or in addition, modulation may be applied to the intensity of the illumination light to improve sensitivity of the system.

In some implementations, coherent light, such as produced by a laser, may be used for the illumination light. A resulting speckle pattern may be used to improve the sensitivity of the system, for example.

In some implementations, polarized light may be used for the illumination light. The camera sensor may include a polarizing filter(s) to enhance the image contrast and sensitivity, and to probe biological markers sensitive to polarization (e.g. glucose concentration).

The camera may include a "hyperspectral" filter array (a filter with more colors or different colors than the tradition three colors of red green and blue) for liveness testing (by probing wavelengths corresponding to biological markers in the skin).

Figure 6:
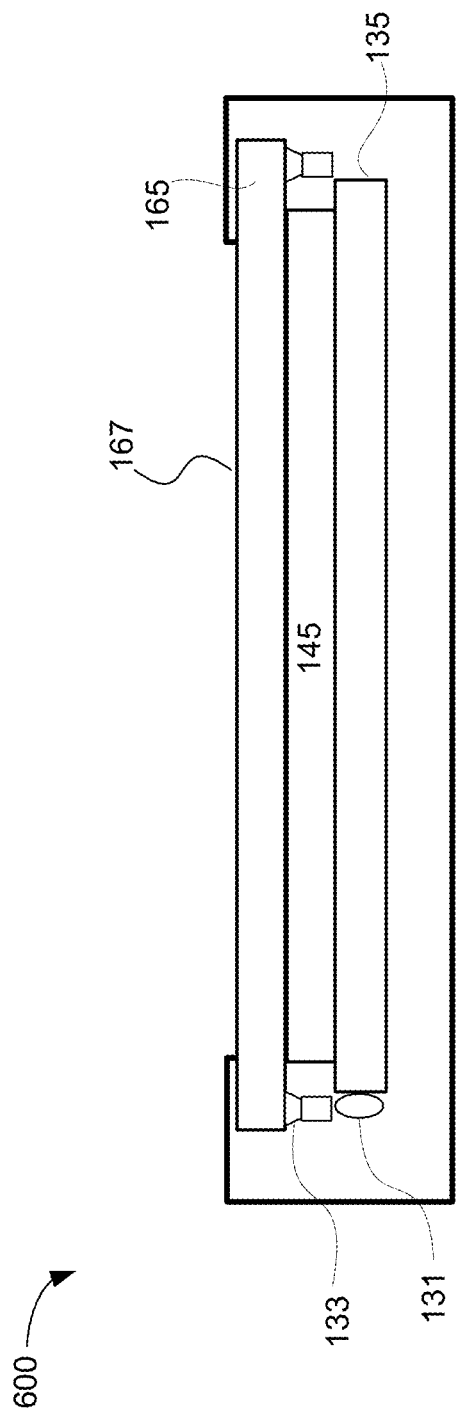
FIG. 6 illustrates a cross-sectional elevation view of the electronic display according to another implementation.

FIG. 6 illustrates a cross-sectional elevation view of the electronic display according to another implementation. In the illustrated implementation, electronic display 600 includes cameras 133 that are located below the plane of the first planar light guide 165. For example, a prism or other light turning arrangement (not illustrated) may be disposed proximate to an edge of the first planar light guide 165. The prism or other light turning arrangement may redirect the scattered IR light 146 toward the camera 133.

Figure 7:
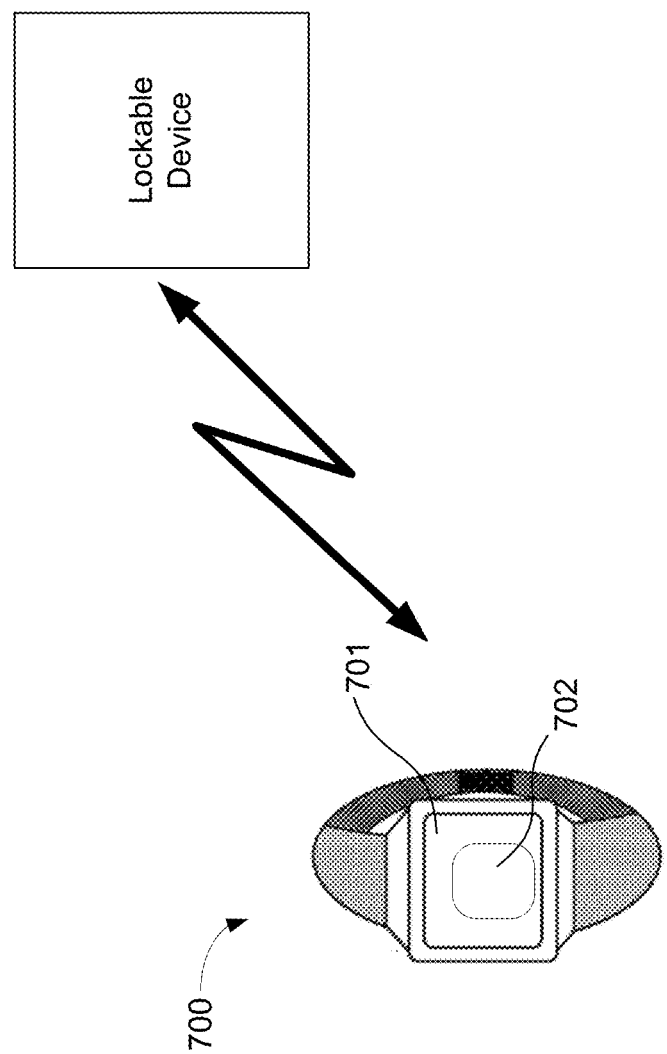
FIG. 7 illustrates a simplified block diagram of an arrangement where an electronic display is communicatively coupled with a remote lockable device.

In some implementations a wearable device may unlock upon recognition of a fingerprint and/or may be configured to unlock a remote device (e.g., a computer a vehicle, a door, a home appliance, medical devices or other devices). As used herein, the meaning of the term "wearable device" encompasses devices that may be worn by a user (e.g., via an arm band, a wrist band, a chest strap, etc.), devices that may be attached to a user's skin (e.g., via adhesive material) and devices that may be implanted, at least temporarily, in a user's body. FIG. 7 illustrates a simplified block diagram of an arrangement where an electronic display is communicatively coupled with a remote lockable device. The electronic display is configured, in the illustrated implementation, as a wearable device 700 having a size and form factor similar to a wristwatch, for example. The electronic display 700 includes a viewing area 701 and, disposed within the viewing area, a fingerprint reading area 702. The wearable device may be communicatively coupled with the remote lockable device by a wired or wireless communication link. The wireless communication link may conform to the Bluetooth or IEEE 802.11 standards, for example.

Similarly to implementations described above in connection with FIG. 1 and FIG. 2, the electronic display 700 may include at least one photosensing element (not illustrated) that detects received scattered light, the received scattered light resulting from interaction of light with a user's finger placed in optical contact with the fingerprint reading area 702. The photosensing element may output fingerprint image data to a processor (not illustrated). The processor may be communicatively coupled with the wearable device 700 and, whether incorporated into the wearable device 700 or not, may be configured to make a biometric authentication of a user based on fingerprint image data. The processor may cause the remote lockable device to lock or unlock after the biometric authentication.

Figure 8:
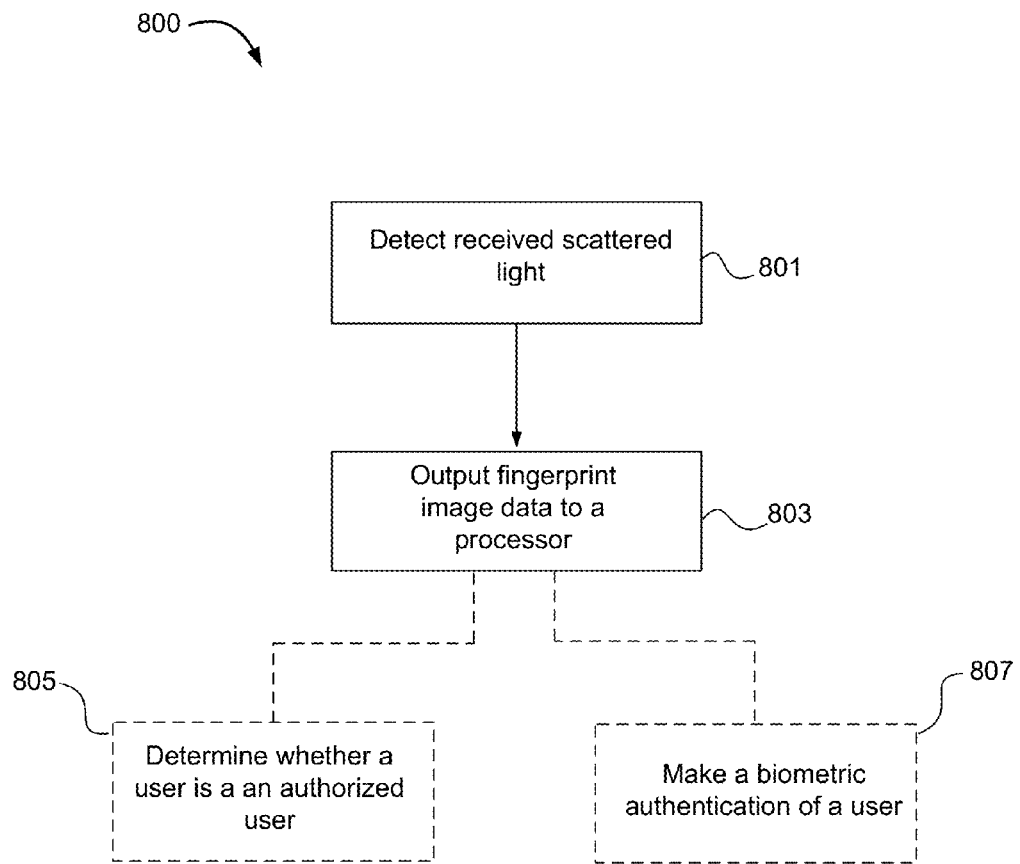
FIG. 8 illustrates a process flow diagram for obtaining fingerprint image data, according to some implementations.

FIG. 8 illustrates a process flow diagram for obtaining fingerprint image data, according to some implementations. The electronic display may be configured to execute the process 800. In some implementations, the electronic display 100, including photosensing element 133 and fingerprint reading area 102 may be configured to execute the process 800 in cooperation with processor 1004. The process 800 may begin at block 801 with detecting with a photosensing element, received scattered light. The received scattered light may result from interaction of light with a user's digit, the digit being in at least partial optical contact with the fingerprint reading area of the electronic display.

At block 803, the photosensing element may output fingerprint image data to the processor. Optionally, the processor may make a determination, at block 805, whether or not the user is an authorized user of the electronic display. For example, the processor may make a comparison between fingerprint image data received from the photosensitive element and fingerprint image data of known and/or authorized users. Optionally, the processor may also make a biometric authentication of a user based on the fingerprint image data, block 807. For example, the fingerprint image data output by the photosensing element may be compared against a database of known fingerprint images in order to authenticate identity of the user.

Thus, improved techniques for providing biometric authentication of a user of an electronic device have been disclosed. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that can be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus comprising:
   an electronic display, having a display cover glass with a front surface that includes a viewing area, and a fingerprint reading area within the viewing area;
   a first planar light guide; and
   at least one photosensing element configured to:
      detect received scattered light, the received scattered light resulting from interaction of light with an object in at least partial optical contact with the front surface within the fingerprint reading area;
      register, within a field of view of the photo sensing element, multiple images of the object, each of the multiple images corresponding to light that is scattered at a respective angle from the object and that undergoes a respective number of internal reflections within the first planar light guide before being detected by the photosensing element; and
      output, to a processor, image data of the multiple images; wherein
         the respective angle and the respective number of internal reflections is different for each of the multiple images; and
         the processor is configured to recognize, from the image data, a fingerprint of a user of the electronic display.

2. The apparatus of claim 1, wherein the fingerprint reading area is co-extensive with the viewing area.

3. The apparatus of claim 1, wherein the photosensing element is disposed in or behind a plane that includes the front surface of the display cover glass.

4. The apparatus of claim 1, wherein the photosensing element is one or both of outside of the viewing area and proximate to a periphery of the viewing area.

5. The apparatus of claim 1, wherein the photosensing element includes a camera.

6. The apparatus of claim 5, wherein the camera includes a lens having an optical axis, the camera being disposed with the optical axis parallel to the front surface.

7. The apparatus of claim 5, wherein the camera includes a video graphics array micro camera.

8. The apparatus of claim 1, wherein the first planar light guide is disposed proximate to and behind the front surface and is configured to redirect the received scattered light toward the photosensing element.

9. The apparatus of claim 8, wherein, the photosensing element is optically coupled to the first planar light guide.

10. The apparatus of claim 8, wherein the display cover glass includes the first planar light guide.

11. The apparatus of claim 8, wherein at least a portion of the scattered light undergoes two or more internal reflections within the planar light guide before being detected by the photosensing element.

12. The apparatus of claim 1, wherein the processor is configured to determine whether a user is an authorized user, based on the fingerprint image data.

13. The apparatus of claim 1, wherein the processor is configured to make a biometric authentication of a user based on the fingerprint image data.

14. The apparatus of claim 13, wherein the processor is configured to make the biometric authentication in real time while the user is interacting with the electronic display screen.

15. The apparatus of claim 13, wherein the biometric authentication includes one or more of determining a user's identity, authenticating that the user is an authorized user, or otherwise classifying the fingerprint.

16. The apparatus of claim 13, wherein the electronic display is communicatively coupled with a remote lockable device and the processor may cause the remote lockable device to lock or unlock after the biometric authentication.

17. The apparatus of claim 16, wherein the electronic display is communicatively coupled with the remote lockable device by a wired or wireless communication link.

18. The apparatus of claim 16, wherein the electronic display is configured as a wearable device.

19. The apparatus of claim 13, wherein the processor is configured to cause the electronic display to present, based on the biometric authentication, user-tailored content.

20. The apparatus of claim 19, wherein the processor is configured to display the user-tailored content in response to one or more of specific application profiles for each of a number of individual users and to a usage history and preferences of such individual users.

21. The apparatus of claim 13, wherein the processor is configured to perform one or more of continuous biometric authentication and biometric authentication of multiple users interacting concurrently with the display screen.

22. The apparatus of claim 1, wherein the electronic display provides an input/output interface to a user of an apparatus or electronic device communicatively coupled with the electronic display.

23. The apparatus of claim 1, wherein the electronic display includes at least one light source directing light into or through the planar light guide.

24. The apparatus of claim 23, wherein the at least one light source includes one or more of a backlight of a liquid-crystal or field sequential color display, a front-light of a reflective display, an emissive display, and an infrared light emitted underneath and through an art-work area of the cover-glass.

25. The apparatus of claim 23, wherein the at least one light source is disposed outside of or proximate to a periphery of the viewing area.

26. The apparatus of claim 1, wherein the electronic display includes a second planar light guide disposed behind the first planar light guide and configured to redirect light received from a light source in a direction having a component orthogonal to the front surface.

27. The apparatus of claim 1, wherein the photosensing element is configured to detect infrared light radiated by a surface of a user appendage.

28. The apparatus of claim 27, wherein the processor is configured to make a liveness determination of the user appendage based on a measurement of the radiated infrared light.

29. An apparatus comprising:
an electronic display, having a display cover glass with a front surface that includes a viewing area, and an optical imaging area within the viewing area;
a first planar light guide; and
at least one photosensing element configured to:
  detect received scattered light, the received scattered light resulting from interaction of light with an object in optical contact with the front surface within the optical imaging area;
  register, within a field of view of the photo sensing element, multiple images of the object, each of the multiple images corresponding to light that is scattered at a respective angle from the object and that undergoes a respective number of internal reflections within the first planar light guide before being detected by the photosensing element; and
  output, to a processor, image data of the multiple images; wherein
    the respective angle and the respective number of internal reflections is different for each of the multiple images; and
    the processor is configured to recognize, from the image data, a characteristic of the object.

30. The apparatus of claim 29, wherein the optical imaging area is co-extensive with the viewing area.

31. The apparatus of claim 29, wherein the object is a finger or other appendage of the user and the optical imaging area is configured as a fingerprint reader.

32. The apparatus of claim 29, wherein the object is a finger or other appendage of the user or an object to be imaged.

33. The apparatus of claim 32, wherein the object to be imaged is a document or displayed image that includes one or more of a bar code identifier or a cryptographic watermark.

34. The apparatus of claim 29, wherein:
the photosensing element is a camera, the camera including a lens having an optical axis; and
the camera is disposed with the optical axis parallel to the front surface.

35. The apparatus of claim 29, wherein the processor is configured to make an authentication of a user based on the image data.

36. The apparatus of claim 35, wherein the electronic display is communicatively coupled with a remote lockable device and the processor may cause the remote lockable device to lock or unlock after the authentication of the user.

37. The apparatus of claim 35, wherein the processor is configured to display, based on the authentication, user-tailored content.

38. An apparatus comprising:
an electronic display, having a display cover glass with a front surface that includes a viewing area, and a fingerprint reading area within the viewing area;
a first planar light guide; and
means for detecting received scattered light, the received scattered light resulting from interaction of light with an object in at least partial optical contact with the fingerprint reading area of the front surface; wherein:
  the means for detecting received scattered light is configured to register, within a field of view of the photo sensing element, multiple images of the object, each of the multiple images corresponding to light that is scattered at a respective angle from the object and that undergoes a respective number of internal reflections within the first planar light guide before being detected by the photosensing element; and
  output, to a processor, image data of the multiple images; wherein
    the respective angle and the respective number of internal reflections is different for each of the multiple images; and
    the processor is configured to recognize, from the image data, a fingerprint of a user of the electronic display.

39. The apparatus of claim 38, wherein the fingerprint reading area is co-extensive with the viewing area.

40. The apparatus of claim 38, wherein the processor is configured to determine whether a user is an authorized user, based on the fingerprint image data.

41. The apparatus of claim 38, wherein the processor is configured to make a biometric authentication of a user based on the fingerprint image data.

42. A method comprising:
detecting, with a photosensing element, received scattered light, the received scattered light resulting from interaction of light with an object being in at least partial optical contact with a fingerprint reading area of a front surface of a display cover glass of an electronic display, the front surface having a viewing area, the fingerprint reading areas being within the viewing area; and
outputting, from the photosensing element to a processor, fingerprint image data; wherein:
  the photosensing element is configured to register, within a field of view of the photo sensing element, multiple images of the object, each of the multiple images corresponding to light that is scattered at a respective angles, angle from the object and that undergoes a respective number of internal reflections within a first planar light guide before being detected by the photosensing element, and to output, to a processor, image data of the multiple images; and
  the respective angle and the respective number of internal reflections is different for each of the multiple images; and
  the processor is configured to recognize, from the image data, a fingerprint of a user of the electronic display.

43. The method of claim 42, wherein the fingerprint reading area is co-extensive with the viewing area.

44. The method of claim 42, further including determining, with a processor, whether a user is an authorized user, based on the fingerprint image data.

45. The method of claim 42, further including making, with a processor, a biometric authentication of a user based on the fingerprint image data.

* * * * *